US008705770B2

(12) United States Patent
Liang

(10) Patent No.: US 8,705,770 B2
(45) Date of Patent: Apr. 22, 2014

(54) METHOD, DEVICE, AND SYSTEM FOR MIXING PROCESSING OF AUDIO SIGNAL

(71) Applicant: Huawei Device Co., Ltd., Guangdong (CN)

(72) Inventor: Liyan Liang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/650,628

(22) Filed: Oct. 12, 2012

(65) Prior Publication Data

US 2013/0034247 A1 Feb. 7, 2013

Related U.S. Application Data

(63) Continuation of application No. PCT/CN2011/072702, filed on Apr. 13, 2011.

(30) Foreign Application Priority Data

Apr. 14, 2010 (CN) .......................... 2010 1 0148346

(51) Int. Cl.
*H04B 1/00* (2006.01)

(52) U.S. Cl.
USPC ..................... 381/119; 348/14.01; 348/14.07; 348/14.08; 348/14.09; 700/94

(58) Field of Classification Search
USPC ................. 381/119; 348/14.01, 14.07, 14.08, 348/14.09; 700/94
See application file for complete search history.

(56) References Cited

U.S. PATENT DOCUMENTS

2008/0232569 A1 9/2008 Diethorn
2010/0182394 A1* 7/2010 Zhan .......................... 348/14.01

FOREIGN PATENT DOCUMENTS

CN 1929593 A 4/2007
CN 101132516 A 2/2008
CN 101510988 A 8/2008
CN 101414463 A 4/2009
WO WO 2008003362 A1 1/2008
WO WO 2008039038 A1 4/2008
WO WO 2008046967 A1 4/2008

OTHER PUBLICATIONS

International Search Report in corresponding International Patent Application No. PCT/CN2011/072702 (Jul. 21, 2011).
Written Opinion of the International Searching Authority in corresponding International Patent Application No. PCT/CN2011/072702 (Jul. 21, 2011).
2nd Office Action in corresponding Chinese Patent Application No. 201010148346.8 (Dec. 20, 2012).
Extended European Search Report in corresponding European Patent Application No. 11768428.2 (Feb. 19, 2013).
Faller et al., "Binaural Cue Coding—Part II: Schemes and Applications," IEEE Transactions on Speech and Audio Processing, vol. 11, No. 6, Nov. 2003, IEEE, New York, New York.

* cited by examiner

*Primary Examiner* — Vivian Chin
*Assistant Examiner* — Paul Kim
(74) *Attorney, Agent, or Firm* — Leydig, Voiy & Mayer, Ltd.

(57) ABSTRACT

A method, a device and a system for mixing processing of an audio signal are provided in the embodiments of the present invention. The method includes: judging a channel type of a receiving terminal; for a single-channel receiving terminal, sending a mixed audio signal and meanwhile sending location information of a sending terminal that has maximum audio signal energy on each sub-band of the mixed audio signal to the single-channel receiving terminal; for a double-channel receiving terminal or a multi-channel receiving terminal, performing up-mixing to obtain double-channel or multi-channel audio data according to location information that is allocated to a single-channel sending terminal, performing mixing processing on audio data that participates in mixing to obtain double-channel or multi-channel mixed audio data, and sending the double-channel or multi-channel mixed audio data.

19 Claims, 6 Drawing Sheets

METHOD, DEVICE, AND SYSTEM FOR MIXING PROCESSING OF AUDIO SIGNAL

CROSS-REFERENCE TO RELATED APPLICATIONS

This application is a continuation of International Patent Application No. PCT/CN2011/072702, filed on Apr. 13, 2011, which claims priority to Chinese Patent Application No. 201010148346.8, filed on Apr. 14, 2010, both of which are hereby incorporated by reference in their entireties.

FIELD OF THE INVENTION

Embodiments of the present invention relate to the field of multimedia communications technologies, and in particular, to a method, a device, and a system for mixing processing of an audio signal.

BACKGROUND OF THE INVENTION

In a multimedia communication system, an MCU (Multipoint Control Unit, multipoint control unit) performs mixing processing on an audio signal sent by a conference site participating in a conference. N-party mixing processing specifically includes: processing, by the MCU, a received audio signal to obtain an audio signal of a conference site with the largest number of parties N; sending a mixed audio signal of the conference site with the largest number of parties N to a conference site outside the conference site with the largest number of parties N; and sending a mixed audio signal of a (N-1)-party conference site other than the conference site with the largest number of parties N to the conference site with the largest number of parties N.

In a process of mixing processing, spatial location information is generally set for a single-channel conference site of the conference site with the largest number of parties N, and the set spatial location information is sent to a single-channel conference site of a receiving party as auxiliary information, so that when a mixed audio signal is played at the single-channel conference site of the receiving party, a location sense is generated.

During implementation of the present invention, the inventor finds that the prior art has at least the following problem.

In an existing mixing processing solution, when conference sites participating in mixing include not only a single-channel conference site but also a double-channel conference site and/or a multi-channel conference site, and receiving parties include not only a single-channel conference site but also a double-channel conference site and/or a multi-channel conference site, a problem of how to enable each conference site participating in mixing to have spatial location information is not solved.

SUMMARY OF THE INVENTION

In view of the preceding proposed technical problem, embodiments of the present invention provide a method, a device, and a system for mixing processing of an audio signal, thereby improving on-the-spot experience of an audience.

Objectives of the present invention are achieved through the following technical solutions.

A method for mixing processing of an audio signal includes:

judging a channel type of a receiving terminal;

for a single-channel receiving terminal, down-mixing an audio signal of a double-channel sending terminal or a multi-channel sending terminal to a single-channel audio signal, mixing an audio signal of a single-channel sending terminal and a processed single-channel audio signal of the double-channel sending terminal and/or the multi-channel sending terminal, encoding the mixed audio signal, sending the encoded mixed audio signal to the single-channel receiving terminal, and sending location information of a sending terminal that has maximum audio signal energy on each sub-band of the mixed audio signal and participates in mixing to the single-channel receiving terminal; and for a double-channel receiving terminal, according to location information that is pre-assigned to the single-channel sending terminal, up-mixing an audio signal of the single-channel sending terminal to obtain a double-channel audio signal of the single-channel sending terminal, where the double-channel audio signal of the single-channel sending terminal has a set location; down-mixing an audio signal of the multi-channel sending terminal to obtain a double-channel audio signal that is corresponding to the multi-channel sending terminal; and performing mixing processing on a processed double-channel audio signal of the single-channel sending terminal that participates in mixing, an audio signal of the double-channel sending terminal, and/or a processed double-channel audio signal of the multi-channel sending terminal, encoding the mixed audio signal, and sending the encoded mixed audio signal to the double-channel receiving terminal;

for a multi-channel receiving terminal, according to the location information that is pre-assigned to the single-channel sending terminal, up-mixing an audio signal of the single-channel sending terminal to obtain a multi-channel audio signal of the single-channel sending terminal, where the multi-channel audio signal of the single-channel sending terminal has a set location; up-mixing an audio signal of the double-channel sending terminal to obtain a multi-channel audio signal that is corresponding to the double-channel sending terminal; and performing mixing processing on a processed multi-channel audio signal of the single-channel sending terminal that participates in mixing, a processed multi-channel audio signal of the double-channel sending terminal, and/or an audio signal of the multi-channel sending terminal, encoding the mixed audio signal, and sending the encoded mixed audio signal to the multi-channel receiving terminal.

A device for mixing processing of an audio signal includes:

a channel type judging module, configured to judge a channel type of a receiving terminal;

a first mixing processing module, configured to down-mix an audio signal of a double-channel sending terminal or a multi-channel sending terminal to a single-channel audio signal, mix an audio signal of a single-channel sending terminal and a processed single-channel audio signal of the double-channel sending terminal and/or the multi-channel sending terminal, encode the mixed audio signal, send the encoded mixed audio signal to the single-channel receiving terminal, and send location information of a sending terminal that has maximum audio signal energy on each sub-band of the mixed audio signal and participates in mixing to the single-channel receiving terminal;

a second mixing processing module, configured to, according to location information that is pre-assigned to the single-channel sending terminal, up-mix an audio signal of the single-channel sending terminal to obtain a double-channel audio signal of the single-channel sending terminal, where the double-channel audio signal of the single-channel sending terminal has a set location; down-mix an audio signal of the multi-channel sending terminal to obtain a double-channel audio signal that is corresponding to the multi-channel sending terminal; and perform mixing processing on a processed double-channel audio signal of the single-channel sending terminal that participates in mixing, an audio signal of the double-channel sending terminal, and/or a processed double-channel audio signal of the multi-channel sending terminal, encode the mixed audio signal, and send the encoded mixed audio signal to a double-channel receiving terminal; and a third mixing processing module, configured to, according to the location information that is pre-assigned to the single-channel sending terminal, up-mix an audio signal of the single-channel sending terminal to obtain a multi-channel audio signal of the single-channel sending terminal, where the multi-channel audio signal of the single-channel sending terminal has a set location; up-mix an audio signal of the double-channel sending terminal to obtain a multi-channel audio signal that is corresponding to the double-channel sending terminal; and perform mixing processing on a processed multi-channel audio signal of the single-channel sending terminal that participates in mixing, a processed multi-channel audio signal of the double-channel sending terminal, and/or an audio signal of the multi-channel sending terminal, encoding the mixed audio signal, and sending the encoded mixed audio signal to the multi-channel receiving terminal.

A method for mixing processing of an audio signal includes:

judging a channel type of a receiving terminal;

for a single-channel receiving terminal, down-mixing an audio signal of a double-channel sending terminal to a single-channel audio signal, mixing an audio signal of a single-channel sending terminal and/or a processed single-channel audio signal of the double-channel sending terminal, encoding the mixed audio signal, sending the encoded mixed audio signal to the single-channel receiving terminal, and sending location information of a sending terminal that has maximum audio signal energy on each sub-band of the mixed audio signal and participates in mixing to the single-channel receiving terminal; and for a double-channel receiving terminal, according to location information that is pre-assigned to the single-channel sending terminal, up-mixing an audio signal of the single-channel sending terminal to obtain a double-channel audio signal of the single-channel sending terminal, where the double-channel audio signal of the single-channel sending terminal has a set location; and performing mixing processing on a processed double-channel audio signal of the single-channel sending terminal that participates in mixing and/or an audio signal of the double-channel sending terminal, encoding the mixed audio signal, and sending the encoded mixed audio signal to the double-channel receiving terminal.

A method for mixing processing of an audio signal includes:

judging a channel type of a receiving terminal;

for a single-channel receiving terminal, down-mixing an audio signal of a multi-channel sending terminal to a single-channel audio signal, mixing an audio signal of a single-channel sending terminal and/or a processed single-channel audio signal of the multi-channel sending terminal, encoding the mixed audio signal, sending the encoded mixed audio signal to the single-channel receiving terminal, and sending location information of a sending terminal that has maximum audio signal energy on each sub-band of the mixed audio signal and participates in mixing to the single-channel receiving terminal; and for a multi-channel receiving terminal, according to location information that is pre-assigned to the single-channel sending terminal, up-mixing an audio signal of the single-channel sending terminal to obtain a multi-channel audio signal of the single-channel sending terminal, where the multi-channel audio signal of the single-channel sending terminal has a set location; and performing mixing processing on a processed multi-channel audio signal of the single-channel sending terminal that participates in mixing and/or an audio signal of the multi-channel sending terminal, encoding the mixed audio signal, and sending the encoded mixed audio signal to the multi-channel receiving terminal.

A method for mixing processing of an audio signal includes:

judging a channel type of a receiving terminal;

for a double-channel receiving terminal, down-mixing an audio signal of a multi-channel sending terminal to obtain a double-channel audio signal that is corresponding to the multi-channel sending terminal; and performing mixing processing on an audio signal of a double-channel sending terminal that participates in mixing and/or a processed double-channel audio signal of the multi-channel sending terminal, encoding the mixed audio signal, and sending the encoded mixed audio signal to the double-channel receiving terminal; and for a multi-channel receiving terminal, up-mixing an audio signal of the double-channel sending terminal to obtain a multi-channel audio signal that is corresponding to the double-channel sending terminal; and performing mixing processing on a processed multi-channel audio signal of the double-channel sending terminal that participates in mixing and/or an audio signal of the multi-channel sending terminal, encoding the mixed audio signal, and sending the encoded mixed audio signal to the multi-channel receiving terminal.

A system for mixing processing of an audio signal includes the preceding device for mixing processing of an audio signal and at least one terminal for sending or receiving an audio signal through the device for mixing processing of an audio signal, where a type of the terminal is a single-channel terminal, a double-channel terminal, or a multi-channel terminal, the terminal is a sending terminal when the terminal participates in mixing, and the terminal is a receiving terminal when the terminal receives a mixed audio signal.

It can be seen from the technical solutions provided in the preceding embodiments of the present invention that, the embodiments of the present invention provide a mixing processing solution of how to enable a location sense of each sending terminal to exist in a mixing system of a sending terminal with any channel type and a receiving terminal with any channel type, thereby improving an on-the-spot feeling of an audience in a conference.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

The technical solutions in the embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 1:
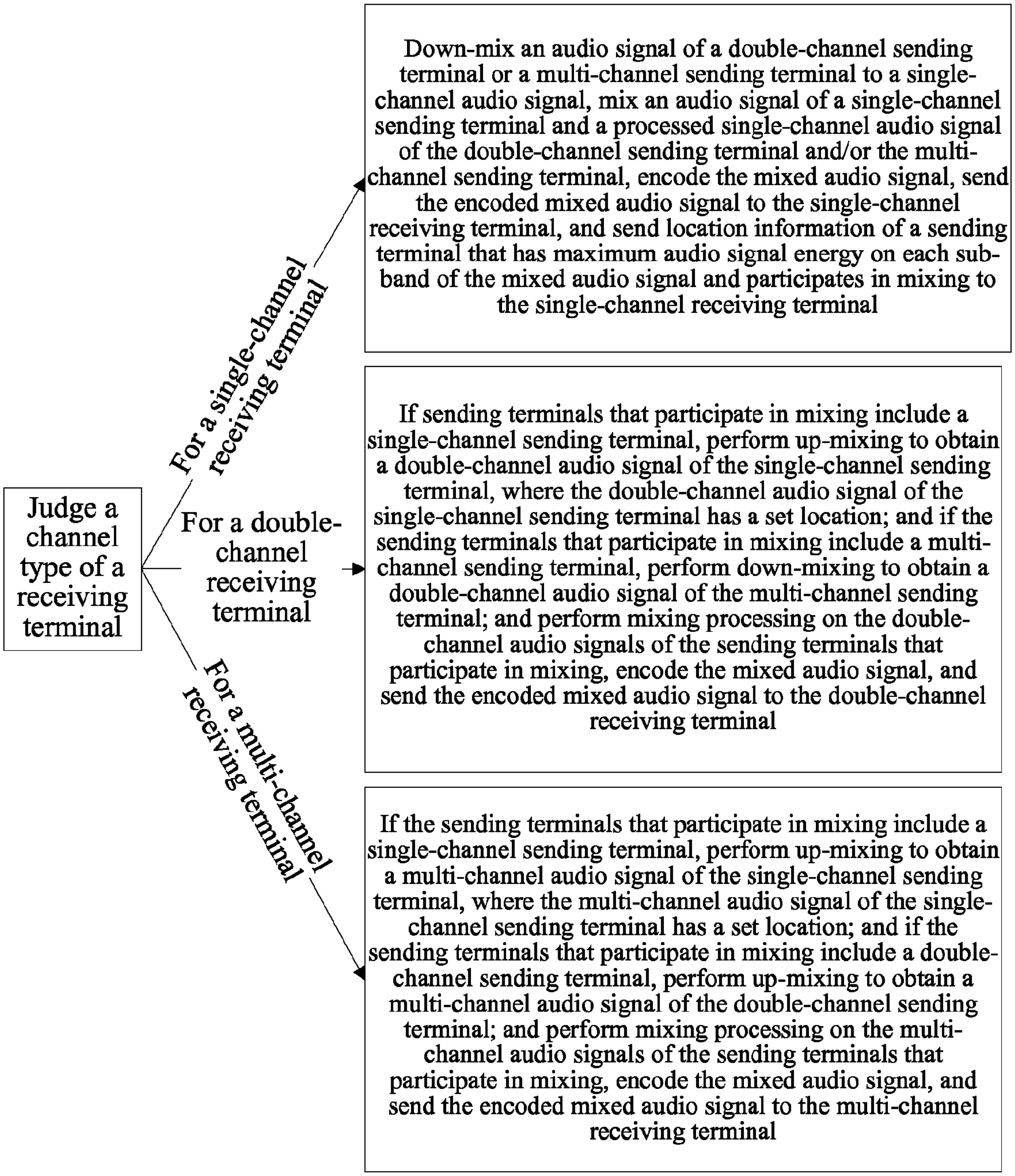
FIG. 1 is a schematic diagram of a mixing processing process according to an embodiment of the present invention.

An embodiment of the present invention provides a method for mixing processing of an audio signal, so that an audience can clearly hear a mixed audio signal in a conference in a mixing system where terminals with any channel type coexist, thereby improving on-the-spot experience of the audience. A processing process of the method may be applied to a video conference, an audio conference, and another audio mixing system. An implementation manner of the method is shown in FIG. 1, including:

S101: Judge a channel type of a receiving terminal; and if the receiving terminal is a single-channel receiving terminal, perform S102; if the receiving terminal is a double-channel receiving terminal, perform S103; and if the receiving terminal is a multi-channel receiving terminal, perform S104.

The multi-channel terminal mentioned in all embodiments of the present invention refers to a terminal, the number of channels of which is three or more than three, and may be classified into a multi-channel receiving terminal and a multi-channel sending terminal according to a function of the multi-channel terminal in a communication process. A multi-channel audio signal refers to an audio signal, the number of channels of which is three or more than three.

S102: Down-mix an audio signal of a double-channel sending terminal or a multi-channel sending terminal to a single-channel audio signal, mix an audio signal of a single-channel sending terminal and a processed single-channel audio signal of the double-channel sending terminal and/or the multi-channel sending terminal, encode the mixed audio signal, send the encoded mixed audio signal to the single-channel receiving terminal, and send location information of a sending terminal that has maximum audio signal energy on each sub-band (in an audio processing technology, several sub-bands are obtained through division according to a frequency domain, so as to process an audio signal in terms of sub-bands) of the mixed audio signal and participates in mixing to the single-channel receiving terminal;

S103: If sending terminals that participate in mixing include a single-channel sending terminal, up-mix an audio signal of the single-channel sending terminal according to location information that is pre-assigned to the single-channel sending terminal to obtain a double-channel audio signal of the single-channel sending terminal, where the double-channel audio signal of the single-channel sending terminal has a set location; and if the sending terminals that participate in mixing include a multi-channel sending terminal, down-mix an audio signal of the multi-channel sending terminal to obtain a double-channel audio signal that is corresponding to the multi-channel sending terminal; and perform mixing processing on a processed double-channel audio signal of the single-channel sending terminal that participates in mixing, an audio signal of the double-channel sending terminal, and/or a processed double-channel audio signal of the multi-channel sending terminal, encode the mixed audio signal, and send the encoded mixed audio signal to the double-channel receiving terminal.

S104: If the sending terminals that participate in mixing include a single-channel sending terminal, up-mix an audio signal of the single-channel sending terminal according to the location information that is pre-assigned to the single-channel sending terminal to obtain a multi-channel audio signal of the single-channel sending terminal, where the multi-channel audio signal of the single-channel sending terminal has a set location; and if the sending terminals that participate in mixing include a double-channel sending terminal, up-mix an audio signal of the double-channel sending terminal to obtain a multi-channel audio signal that is corresponding to the double-channel sending terminal; and perform mixing processing on a processed multi-channel audio signal of the single-channel sending terminal that participates in mixing, a processed multi-channel audio signal of the double-channel sending terminal, and/or an audio signal of the multi-channel sending terminal, encode the mixed audio signal, and send the encoded mixed audio signal to the multi-channel receiving terminal.

The single-channel sending terminal and the single-channel receiving terminal refer to terminals that transmit an audio signal by using a single channel. The double-channel sending terminal and the double-channel receiving terminal refer to terminals that transmit an audio signal by using double channels. The multi-channel sending terminal and the multi-channel receiving terminal refer to terminals that transmit an audio signal by using multiple channels (for example, a 5.1 channel, the number of channels of which is greater than or equal to three).

A location of the sending terminal may be such a location as a left location, a right location, a left-of-center location, a right-of-center location, a front location, a back location, or a middle location.

In a mixing system, a terminal may be used as a sending terminal and a receiving terminal at the same time (that is, has a sending function and a receiving function at the same time). A video communication system is taken as an example. A conference site with the largest number of parties N (a sending terminal) that participates in mixing also receives a mixed audio signal of another (N-1)-party conference site other than the conference site with the largest number of parties N.

In this embodiment of the present invention, the up-mixing refers to processing an N-channel audio signal to obtain an M-channel audio signal, where N and M are positive integers and N<M. The down-mixing refers to processing an E-channel audio signal to obtain an F-channel audio signal, where E and F are positive integers and F<E.

With the technical solution provided in this embodiment of the present invention, in a mixing system of a sending terminal with any channel type and a receiving terminal with any channel type, a location sense of each sending terminal that participates in mixing exists, thereby improving an on-the-spot feeling of an audience in a conference.

In the preceding S102, the audio signal of the double-channel sending terminal or the multi-channel sending terminal needs to be down-mixed to the single-channel audio signal, where the double-channel sending terminal or the multi-channel sending terminal participates in mixing, so as to participate in mixing. As an example rather than a limitation, a specific implementation manner is as follows: detecting each channel of the double-channel sending terminal or the multi-channel sending terminal, selecting a channel whose audio signal energy satisfies a predetermined condition, and merging audio signals of the channel whose audio signal energy satisfies the predetermined condition into a single-channel audio signal. As an example rather than a limitation, the satisfying the predetermined condition may be being greater than a set threshold (N), which indicates that an audio signal of the channel is a valid voice signal rather than a background noise; and the predetermined condition to be satisfied may also be a discriminant that is generated for a valid voice signal.

The preceding S102 further includes an implementation manner of obtaining the location information of the sending terminal that has the maximum audio signal energy on each sub-band of the mixed audio signal and participates in mixing, where the implementation manner is: on each sub-band of a signal that participates in mixing, respectively comparing energy of the audio signal of the single-channel sending terminal that participates in mixing, energy of the processed single-channel audio signal of the double-channel sending terminal that participates in mixing, and/or energy of the processed single-channel audio signal of the multi-channel sending terminal that participates in mixing; determining a sending terminal that has maximum audio signal energy on each sub-band and participates in mixing; and obtaining location information of the sending terminal that has the maximum audio signal energy on each sub-band and participates in mixing. Location information of the single-channel sending terminal is location information that is pre-allocated to the single-channel sending terminal, and location information of the double-channel sending terminal or the multi-channel sending terminal may be obtained through detection. A specific detection manner belongs to the prior art and is not described here again. Alternatively, the location information of the double-channel sending terminal or the multi-channel sending terminal may also be location information that is pre-allocated to the double-channel sending terminal or the multi-channel sending terminal.

As an example rather than a limitation, in the preceding S102, a specific implementation manner of mixing the audio signal of the single-channel sending terminal, the processed single-channel audio signal of the double-channel sending terminal and/or the multi-channel sending terminal is: superimposing the audio signal of the single-channel sending terminal and the processed single-channel audio signal of the double-channel sending terminal and/or the multi-channel sending terminal to obtain a mixed audio signal.

As an example rather than a limitation, in the preceding S103, if the sending terminals that participate in mixing include the single-channel sending terminal, a specific implementation manner of performing up-mixing according to the location information that is pre-assigned to the single-channel sending terminal to obtain the double-channel audio signal of the single-channel sending terminal, where the double-channel audio signal of the single-channel sending terminal has the set location, may specifically be: allocating energy to the single-channel audio signal of the single-channel sending terminal according to the location information of the single-channel sending terminal to obtain a double-channel audio signal that has spatial location information. For example, if a location that is assigned to the single-channel sending terminal is a "right" location, energy of a right-channel audio signal that is to be generated may be set to be greater than energy of a left-channel audio signal that is to be generated.

As an example rather than a limitation, in the preceding S103, if the sending terminals that participate in mixing include the multi-channel sending terminal, a specific implementation manner of performing down-mixing to obtain the double-channel audio signal of the multi-channel sending terminal may be: re-allocating energy to a multi-channel audio signal of the multi-channel sending terminal according to location information of the multi-channel sending terminal to obtain a double-channel audio signal that has the location information of the multi-channel sending terminal.

As an example rather than a limitation, in the preceding S103, a specific implementation manner of mixing the processed double-channel audio signal of the single-channel sending terminal that participates in mixing, the audio signal of the double-channel sending terminal, and/or the processed double-channel audio signal of the multi-channel sending terminal may be: superimposing a processed left-channel audio signal of the single-channel sending terminal that participates in mixing, a left-channel audio signal of the double-channel sending terminal, and/or a processed left-channel audio signal of the multi-channel sending terminal; superimposing a processed right-channel audio signal of the single-channel sending terminal that participates in mixing, a right-channel audio signal of the double-channel sending terminal, and/or a processed right-channel audio signal of the multi-channel sending terminal; and obtaining a mixed double-channel audio signal.

In the preceding S104, if the sending terminals that participate in mixing include the single-channel sending terminal that participates in mixing, for a specific implementation manner of performing up-mixing according to the location information that is pre-assigned to the single-channel sending terminal to obtain the multi-channel audio signal of the single-channel sending terminal, where the multi-channel audio signal of the single-channel sending terminal has the set location, reference may be made to an implementation manner of generating the double-channel audio signal, which is not described here again.

As an example rather than a limitation, in the preceding S104, if the sending terminals that participate in mixing include the double-channel sending terminal, a specific implementation manner of performing up-mixing to obtain the multi-channel audio signal of the double-channel sending terminal may be: re-allocating energy to a double-channel audio signal of the double-channel sending terminal according to location information of the double-channel sending terminal to obtain a multi-channel audio signal that has the location information of the double-channel sending terminal.

As an example rather than a limitation, in the preceding S104, an implementation manner of mixing the processed multi-channel audio signal of the single-channel sending terminal that participates in mixing, the processed double-channel audio signal of the double-channel sending terminal, and/or the audio signal of the multi-channel sending terminal is:

superimposing audio signals with the same channel in the processed multi-channel audio signal of the single-channel sending terminal that participates in mixing, the processed multi-channel audio signal of the double-channel sending terminal, and/or the audio signal of the multi-channel sending terminal respectively; and obtaining a mixed multi-channel audio signal.

In this embodiment of the present invention, the location information of the single-channel sending terminal that participates in mixing is pre-assigned to the single-channel sending terminal, and the location information of the double-channel sending terminal or the multi-channel sending terminal may also be pre-assigned to the double-channel sending terminal or the multi-channel sending terminal. An implementation manner of assigning the location information to the single-channel sending terminal, the double-channel sending terminal, or the multi-channel sending terminal includes, but is not limited to:

(1) When a sending terminal (referring to the single-channel sending terminal, the double-channel sending terminal, or the multi-channel sending terminal, which is similar in the following) enters a mixing system, a control end (for example, an MCU) assigns location information to the sending terminal.

Figure 2:
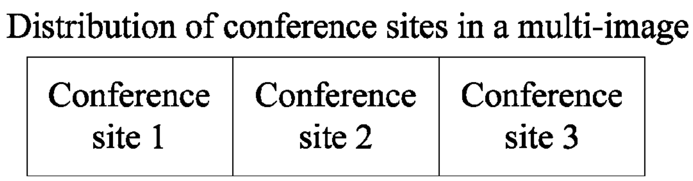
FIG. 2 is a schematic diagram of multi-image display according to an embodiment of the present invention.
Figure 3:
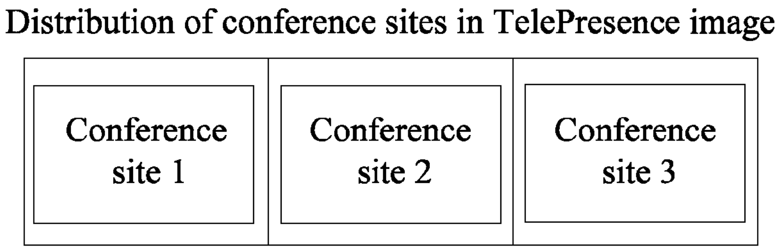
FIG. 3 is a schematic diagram of TelePresence image display according to an embodiment of the present invention.

(2) If this embodiment of the present invention is applied in a video communication system, location information is assigned to the sending terminal according to a position of the sending terminal in a video image of the video communication system. The position in the video image may refer to a display position in a multi-image, that is, in a multi-grid image of a display screen and may also refer to a display position in a TelePresence image, that is, in a video image formed by multiple display screens. For example, in a multi-image shown in FIG. 2, a display position of a conference site 1 in the multi-image is a left position, and a location of the conference site 1 is assigned to be a “left” location. In a TelePresence image shown in FIG. 3, a display position of a conference site 2 in the TelePresence image is a middle position, and a location of the conference site 2 is assigned to be a “middle” location.

(3) If this embodiment of the present invention is applied in a communication system, a receiving terminal may assign a location to the sending terminal that participates in mixing and sends location assignment information to the control end. The location assignment information is a location that is assigned by the receiving terminal to the sending terminal, and the control end sets location information for the sending terminal according to the location assignment information. The location assignment information may also carry assignment validation information. The assignment validation information is used to indicate that location information is assigned to the sending terminal only during mixing processing of sending it to the receiving terminal, or location information is assigned to the sending terminal during mixing processing of sending it to several or all receiving terminals. If multiple receiving terminals assign a location to the same sending terminal, the control end may set a location for the sending terminal in turn according to an order of receiving different location assignment information, or set a location for the sending terminal in a manner of requesting for a token, and may also control, according to another set rule, permission that the receiving terminal sets a location for the sending terminal.

When types of terminals in the mixing system include a single-channel terminal and a double-channel terminal, an embodiment of the present invention provides a method for mixing processing of an audio signal, where the method includes the following operations:

judging a channel type of a receiving terminal;

for a single-channel receiving terminal, down-mixing an audio signal of a double-channel sending terminal to a single-channel audio signal, mixing an audio signal of a single-channel sending terminal and/or a processed single-channel audio signal of the double-channel sending terminal, encoding the mixed audio signal, sending the encoded mixed audio signal to the single-channel receiving terminal, and sending location information of a sending terminal that has maximum audio signal energy on each sub-band of the mixed audio signal and participates in mixing to the single-channel receiving terminal; and for a double-channel receiving terminal, according to location information that is pre-assigned to the single-channel sending terminal, up-mixing an audio signal of the single-channel sending terminal to obtain a double-channel audio signal of the single-channel sending terminal, where the double-channel audio signal of the single-channel sending terminal has a set location; and performing mixing processing on a processed double-channel audio signal of the single-channel sending terminal that participates in mixing and/or an audio signal of the double-channel sending terminal, encoding the mixed audio signal, and sending the encoded mixed audio signal to the double-channel receiving terminal.

An implementation manner of down-mixing the double-channel sending terminal that participates in mixing to the single-channel audio signal is described in the preceding embodiment of the present invention, and is not described here again.

Before the mixing the audio signal of the single-channel sending terminal and/or the processed single-channel audio signal of the double-channel sending terminal, encoding the mixed audio signal, sending the encoded mixed audio signal to the single-channel receiving terminal, and sending the location information of the sending terminal that has the maximum audio signal energy on each sub-band of the mixed audio signal and participates in mixing to the single-channel receiving terminal, the method further includes: on each sub-band obtained by pre-dividing a frequency band of a signal that participates in mixing, respectively comparing energy of the audio signal of the single-channel sending terminal that participates in mixing and/or energy of the processed single-channel audio signal of the double-channel sending terminal that participates in mixing; determining a sending terminal that has maximum audio signal energy on each sub-band and participates in mixing; and obtaining location information of the sending terminal that has the maximum audio signal energy on each sub-band and participates in mixing.

When types of terminals in the mixing system include a single-channel terminal and a multi-channel terminal, an embodiment of the present invention provides a method for mixing processing of an audio signal, where the method includes the following operations:

judging a channel type of a receiving terminal;

for a single-channel receiving terminal, down-mixing an audio signal of a multi-channel sending terminal to a single-channel audio signal, mixing an audio signal of a single-channel sending terminal and/or a processed single-channel audio signal of the multi-channel sending terminal, encoding the mixed audio signal, sending the encoded mixed audio signal to the single-channel receiving terminal, and sending location information of a sending terminal that has maximum audio signal energy on each sub-band of the mixed audio signal and participates in mixing to the single-channel receiving terminal; and for a multi-channel receiving terminal, according to location information that is pre-assigned to the single-channel sending terminal, up-mixing an audio signal of the single-channel sending terminal to obtain a multi-channel audio signal of the single-channel sending terminal, where the multi-channel audio signal of the single-channel sending terminal has a set location; and performing mixing processing on a processed multi-channel audio signal of the single-channel sending terminal that participates in mixing and/or an audio signal of the multi-channel sending terminal, encoding the mixed audio signal, and sending the encoded mixed audio signal to the multi-channel receiving terminal.

An implementation manner of down-mixing the multi-channel sending terminal that participates in mixing to the single-channel audio signal is described in the preceding embodiment of the present invention, and is not described here again.

Before the mixing the audio signal of the single-channel sending terminal and/or the processed single-channel audio signal of the multi-channel sending terminal, encoding the mixed audio signal, sending the encoded mixed audio signal to the single-channel receiving terminal, and sending the location information of the sending terminal that has the maximum audio signal energy on each sub-band of the mixed audio signal and participates in mixing to the single-channel receiving terminal, the method further includes: on each sub-band obtained by pre-dividing a frequency band of a signal that participates in mixing, respectively comparing energy of the audio signal of the single-channel sending terminal that participates in mixing and/or energy of the processed single-channel audio signal of the multi-channel sending terminal that participates in mixing; determining a sending terminal that has maximum audio signal energy on each sub-band and participates in mixing; and obtaining location information of the sending terminal that has the maximum audio signal energy on each sub-band and participates in mixing.

When types of terminals in the mixing system include a double-channel terminal and a multi-channel terminal, an embodiment of the present invention provides a method for mixing processing of an audio signal, where the method includes the following operations:

judging a channel type of a receiving terminal;

for a double-channel receiving terminal, down-mixing an audio signal of a multi-channel sending terminal to obtain a double-channel audio signal that is corresponding to the multi-channel sending terminal; and perform mixing processing on an audio signal of a double-channel sending terminal that participates in mixing and/or a processed double-channel audio signal of the multi-channel sending terminal, encoding the mixed audio signal, and sending the encoded mixed audio signal to the double-channel receiving terminal; and for a multi-channel receiving terminal, up-mixing an audio signal of the double-channel sending terminal to obtain a multi-channel audio signal that is corresponding to the double-channel sending terminal; and perform mixing processing on a processed multi-channel audio signal of the double-channel sending terminal that participates in mixing and/or an audio signal of the multi-channel sending terminal, encoding the mixed audio signal, and sending the encoded mixed audio signal to the multi-channel receiving terminal.

Implementation manners of up-mixing a double-channel audio signal to obtain a multi-channel audio signal and down-mixing a multi-channel audio signal to obtain a double-channel audio signal are described in the preceding embodiment of the present invention, and are not described here again.

A specific implementation manner of this embodiment of the present invention in an actual application process is described in detail in the following.

A video communication system is taken as an example. After receiving a voice code stream of each conference site in a video conference, an MCU decodes the voice code stream of each conference site, calculates an envelope of an decoded voice signal of each conference site, and obtains a conference site with the largest number of parties N by comparing an envelope of a voice signal of each conference site. Audio signals of the conference site with the largest number of parties N are mixed and then sent. In a mixing processing process, the MCU judges a channel type of the conference site with the largest number of parties N that participates in mixing and a channel type of a conference site at a receiving end, performs corresponding processing respectively according to the channel type of the conference site with the largest number of parties N that participates in mixing, and then performs corresponding mixing processing and sends it to conference sites at the receiving end, where the conference sites have different channel types.

A conference site that participates in a conference may be a single-channel conference site, a double-channel conference site, and/or a multi-channel conference site. In the following application embodiments, applications of the method for mixing processing provided in this embodiment of the present invention in a scenario where mixed audio signals that are output in different mixing modes are sent to conference sites with different channel modes are described in detail respectively.

Embodiment 1

Figure 4:
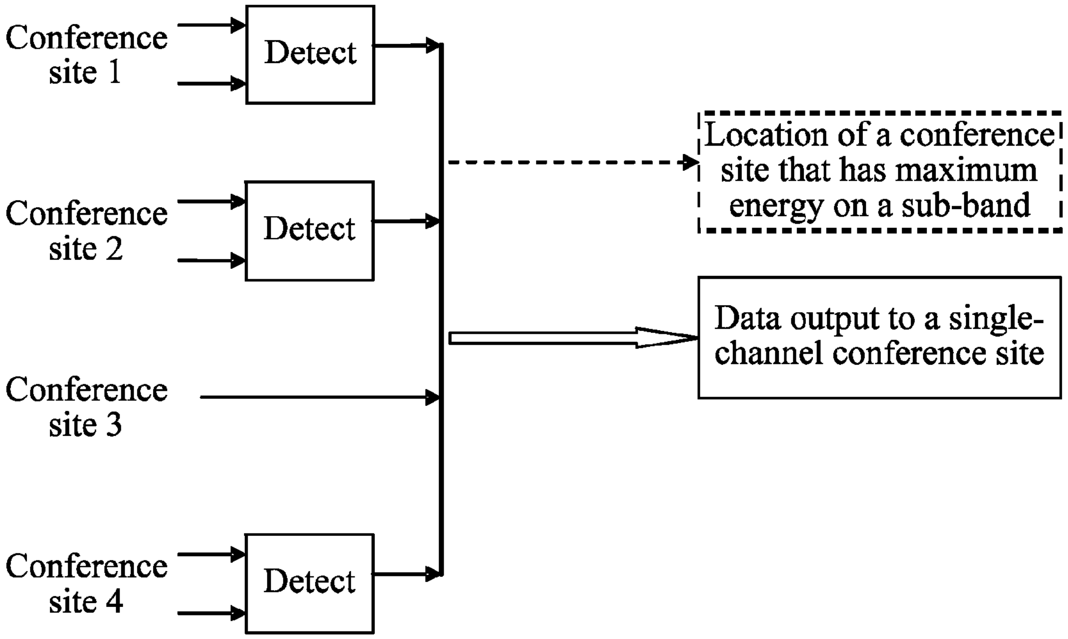
FIG. 4 is a schematic diagram of a mixing system according to a first embodiment of the present invention.
Figure 5:
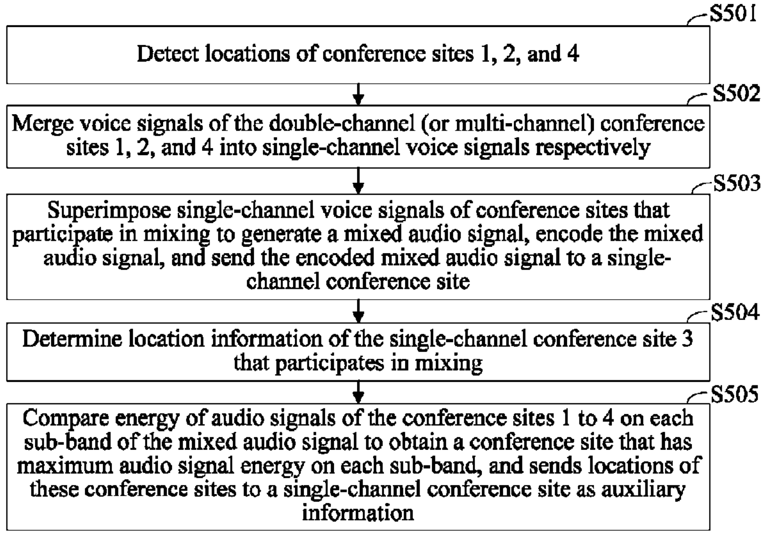
FIG. 5 is a schematic diagram of a mixing processing process according to the first embodiment of the present invention.

In a first embodiment, for a single-channel receiving end, a mixing scenario of a largest four-party conference site is shown in FIG. 4. Conference sites 1, 2, and 4 in the largest four-party conference site are double-channel (or multi-channel) conference sites, and a conference site 3 is a single-channel conference site. A process of mixing processing is shown in FIG. 5. A specific implementation manner includes the following operations.

S501: An MCU detects locations of conference sites 1, 2, and 4.

S502: The MCU detects each channel of double-channel (or multi-channel) conference sites 1, 2, and 4; selects, from channels of each conference site, a channel whose audio signal energy satisfies a predetermined condition; if audio signal energy of only one channel satisfies the predetermined condition, uses an audio signal of the channel as a single-channel audio signal of the conference site to participate in mixing processing; and if audio signal energy of two (or more) channels of the conference site satisfies the predetermined condition, superimposes audio signals of the two (or more) channels to obtain a single-channel audio signal to participate in mixing processing. As an example rather than a limitation, the satisfying the predetermined condition may be being greater than a set threshold (N), which indicates that an audio signal of the channel is a valid voice signal rather than a background noise; and the predetermined condition to be satisfied may also be a discriminant that is generated for a valid voice signal.

S503: The MCU superimposes a single-channel audio signal obtained by processing in S502 and an audio signal of a single-channel conference site 3 to generate a mixed audio signal, encodes the mixed audio signal, and then sends the encoded mixed audio signal to a single-channel conference site other than the largest four-party conference site; and superimposes single-channel audio signals obtained by processing in S502 to generate a mixed audio signal, encodes the mixed audio signal, and sends the encoded mixed audio signal to the single-channel conference site 3.

S504: The MCU determines location information of the single-channel conference site 3 that participates in mixing, where a location of the single-channel conference site 3 may be pre-assigned by the MCU, may also be a location of the single-channel conference site 3 in a video image, and may also be a location that is assigned by a conference site that participates in a conference.

S505: The MCU compares energy of audio signals of the conference sites 1 to 4 on each sub-band of the mixed audio signal to obtain a conference site that has maximum audio signal energy on each sub-band, and sends a location of the conference site that has the maximum audio signal energy on each sub-band to a single-channel conference site other than the largest four-party conference site as auxiliary information, where the audio signals refer to an audio signal of the single-channel conference site 3 and processed single-channel audio signals of the double-channel (or multi-channel) conference sites 1, 2, and 4.

A single-channel conference site at a receiving end obtains, according to a received mixed audio signal and auxiliary information, an audio signal carrying location information of a conference site that participates in mixing. Processing performed by the single-channel conference site at the receiving end on the mixed audio signal and the location information may be implemented through an existing technical means, which is not a discussion focus of this embodiment of the present invention, and is not described here again.

In the processing process, operations of S502 and S503 may be completed at any time after the MCU completes detection on the locations of the conference sites 1, 2, and 4, and are not limited to a time sequence described in the first embodiment.

Through the preceding mixing processing process, when a mixed audio signal is output to a single-channel conference site in any channel type of mixing mode, a location sense of sound that is heard by a single-channel conference site at a receiving end exists, thereby improving on-the-spot experience of an audience.

Embodiment 2

Figure 6:
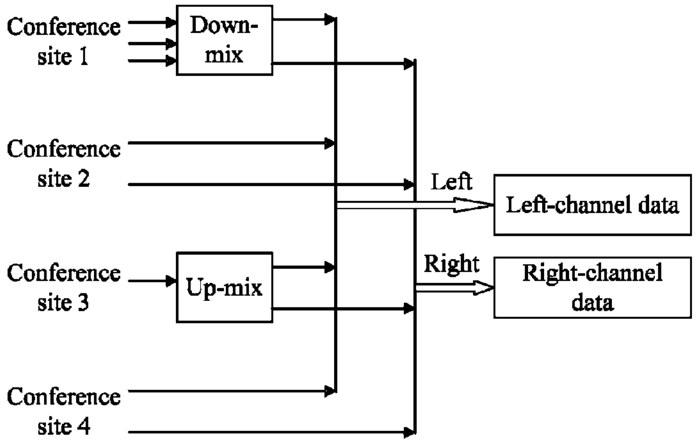
FIG. 6 is a schematic diagram of a mixing system according to a second embodiment of the present invention.
Figure 7:
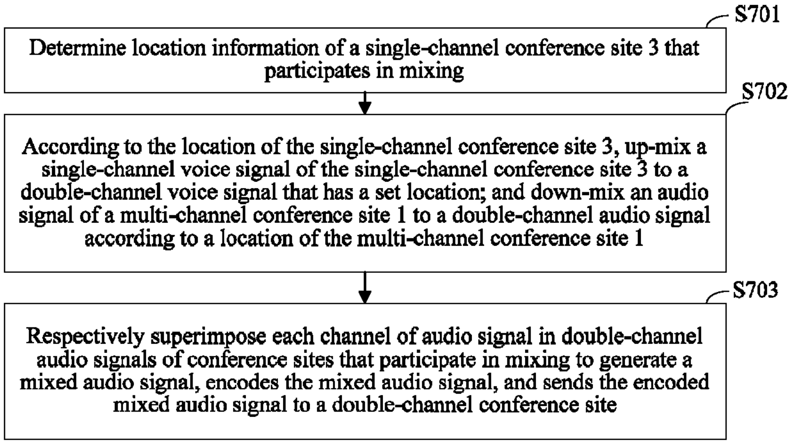
FIG. 7 is a schematic diagram of a mixing processing process according to the second embodiment of the present invention.

In a second embodiment, for a double-channel receiving end, a mixing scenario of a largest four-party conference site is shown in FIG. 6. Conference sites 2 and 4 in the largest four-party conference site are double-channel conference sites, a conference site 3 is a single-channel conference site, and a conference site 1 is a multi-channel conference site. A process of mixing processing is shown in FIG. 7. A specific implementation manner includes the following operations.

S701: An MCU determines location information of a single-channel conference site 3 that participates in mixing, where a location of the single-channel conference site 3 may be assigned by the MCU, may also be a location of the single-channel conference site 3 in a video image, and may also be a location that is assigned by a conference site that participates in a conference.

S702: According to the location of the single-channel conference site 3, by allocating energy to a single-channel audio signal of the single-channel conference site 3, the MCU upmixes the single-channel audio signal of the single-channel conference site 3 to a double-channel audio signal that has a set location; and the MCU re-allocates energy to an audio signal of a multi-channel conference site 1 according to a location of the multi-channel conference site 1 to obtain a double-channel audio signal.

S703: The MCU superimposes each channel of audio signal in double-channel audio signals of the four conference sites respectively to generate a double-channel mixed audio signal, encodes the mixed audio signal, and sends the encoded mixed audio signal to a double-channel conference site other than the largest four-party conference site; the MCU superimposes each channel of audio signal in double-channel audio signals of the conference sites 1, 3, and 4 respectively to generate a double-channel mixed audio signal, encodes the mixed audio signal, and sends the encoded mixed audio signal to a double-channel conference site 2; and the MCU superimposes each channel of audio signal in double-channel audio signals of the conference sites 1, 2, and 3 respectively to generate a double-channel mixed audio signal, encodes the mixed audio signal, and sends the encoded mixed audio signal to a double-channel conference site 4.

A double-channel conference site at a receiving end plays, according to a received mixed audio signal that has spatial location information, a voice of a conference site that participates in mixing. Processing performed by the double-channel conference site at the receiving end on the mixed audio signal may be implemented through an existing technical means, which is not a discussion focus of this embodiment of the present invention, and is not described here again.

Through the preceding mixing processing process, when a mixed audio signal is output to a double-channel conference site in any channel type of mixing mode, a location sense of sound that is heard by a double-channel conference site at a receiving end exists, thereby improving on-the-spot experience of an audience.

Embodiment 3

Figure 8:
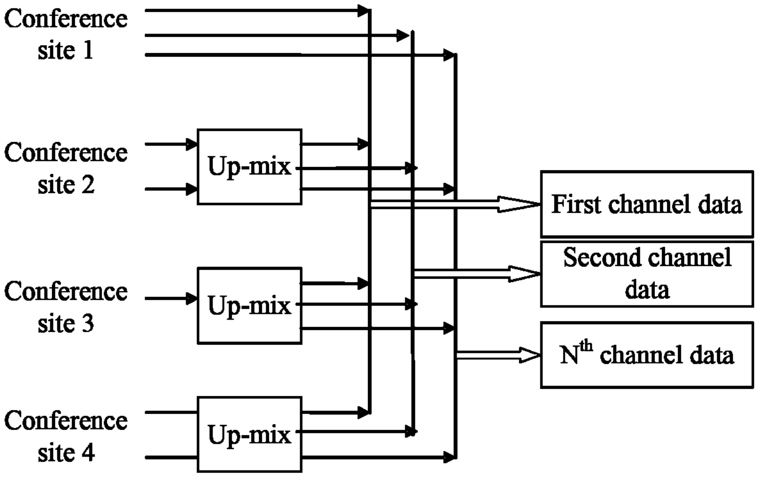
FIG. 8 is a schematic diagram of a mixing system according to a third embodiment of the present invention.
Figure 9:
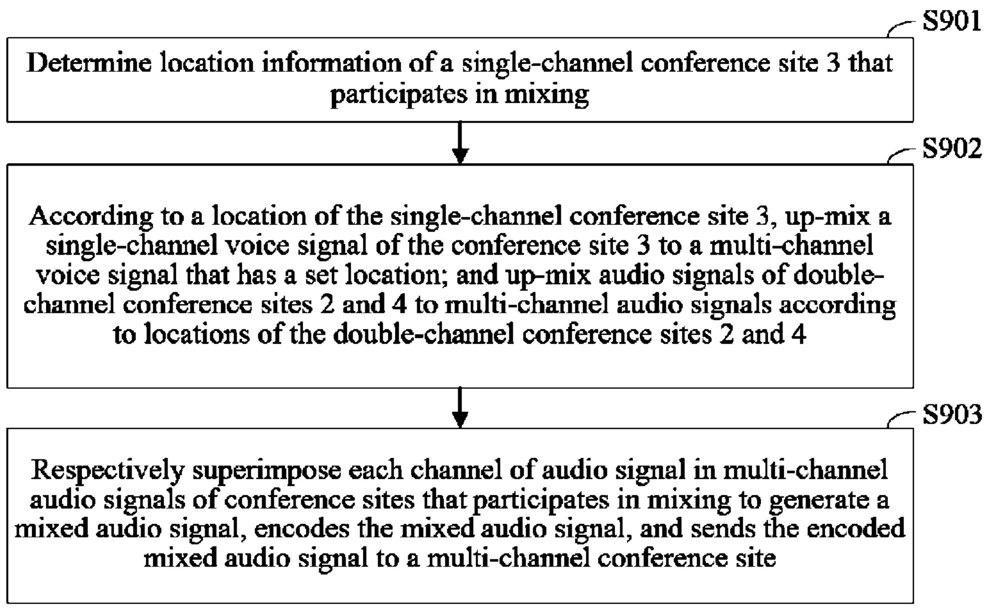
FIG. 9 is a schematic diagram of a mixing processing process according to the third embodiment of the present invention.

In a third embodiment, for a multi-channel receiving end, a mixing scenario of a largest four-party conference site is shown in FIG. 8. Conference sites 2 and 4 in the largest four-party conference site are double-channel conference sites, a conference site 3 is a single-channel conference site, and a conference site 1 is a multi-channel conference site. A process of mixing processing is shown in FIG. 9. A specific implementation manner includes the following operations.

S901: An MCU determines location information of a single-channel conference site 3 that participates in mixing, where a location of the single-channel conference site 3 may be assigned by the MCU, may also be a location of the single-channel conference site 3 in a video image, and may also be a location that is assigned by a conference site that participates in a conference.

S902: According to the location of the single-channel conference site 3, by allocating energy to a single-channel audio signal of the single-channel conference site 3, the MCU upmixes the single-channel audio signal of the single-channel conference site 3 to a multi-channel audio signal that has a set location; the MCU re-allocates energy to an audio signal of a double-channel conference site 2 according to a location of the double-channel conference site 2 to obtain a multi-channel audio signal; and the MCU re-allocates energy to an audio signal of a double-channel conference site 4 according to a location of the double-channel conference site 4 to obtain a multi-channel audio signal.

S903: The MCU superimposes each channel of audio signal in multi-channel audio signals of the four conference sites respectively to generate a multi-channel mixed audio signal, encodes the mixed audio signal, and sends the encoded mixed audio signal to a multi-channel conference site other than the largest four-party conference site; and the MCU superimposes each channel of audio signal in multi-channel audio signals of the conference sites 2, 3, and 4 to generate a multi-channel mixed audio signal, encodes the mixed audio signal, and sends the encoded mixed audio signal to a multi-channel conference site 1.

A multi-channel conference site at a receiving end plays, according to a received mixed audio signal that has spatial location information, a voice of a conference site that participates in mixing. Processing performed by the multi-channel conference site at the receiving end on the mixed audio signal may be implemented through an existing technical means, which is not a discussion focus of this embodiment of the present invention, and is not described here again.

Through the preceding mixing processing process, when a mixed audio signal is output to a multi-channel conference site in any channel type of mixing mode, a location sense of sound that is heard by a multi-channel conference site at a receiving end exists, thereby improving on-the-spot experience of an audience.

Figure 10:
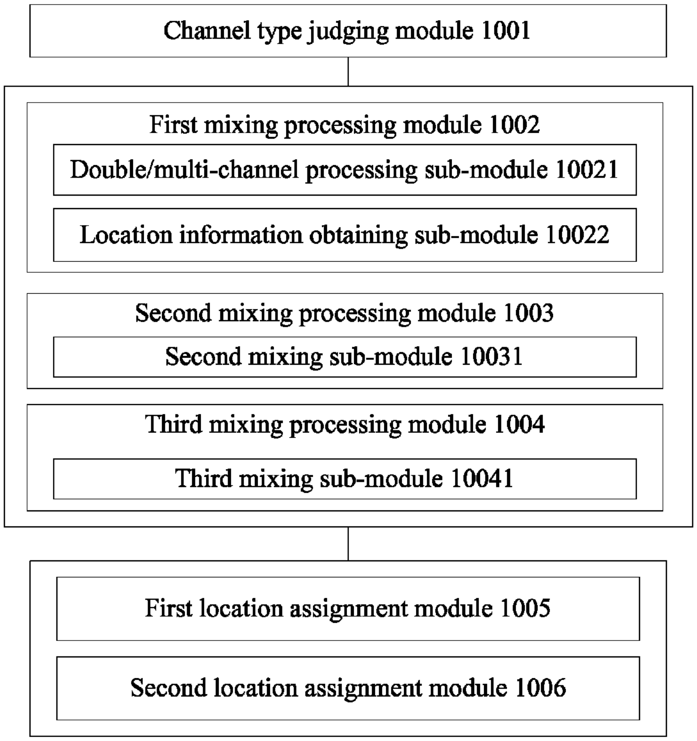
FIG. 10 is a schematic structural diagram of a device according to an embodiment of the present invention.

An embodiment of the present invention further provides a device for mixing processing of an audio signal. A structure of the device is shown in FIG. 10. A specific implementation structure includes:

a channel type judging module 1001, configured to judge a channel type of a receiving terminal; if the receiving terminal is a single-channel receiving terminal, instruct a first mixing processing module 1002 to work; if the receiving terminal is a double-channel receiving terminal, instruct a second mixing processing module 1003 to work; and if the receiving terminal is a multi-channel receiving terminal, instruct a third mixing processing module 1004 to work;

the first mixing processing module 1002, configured to down-mix an audio signal of a double-channel sending terminal or a multi-channel sending terminal to a single-channel audio signal, mix an audio signal of a single-channel sending terminal and a processed single-channel audio signal of the double-channel sending terminal and/or the multi-channel sending terminal, encode the mixed audio signal, send the encoded mixed audio signal to the single-channel receiving terminal, and send location information of a sending terminal that has maximum audio signal energy on each sub-band (in an audio processing technology, several sub-bands are obtained through division according to a frequency domain, so as to process an audio signal in terms of sub-bands) of the mixed audio signal and participates in mixing to the single-channel receiving terminal, where a specific implementation manner of mixing the audio signal of the single-channel sending terminal and the processed single-channel audio signal of the double-channel sending terminal and/or the multi-channel sending terminal may be, but is not limited to: superimposing the audio signal of the single-channel sending terminal and the processed single-channel audio signal of the double-channel sending terminal and/or the multi-channel sending terminal to obtain a mixed audio signal;

the second mixing processing module 1003, configured to, if sending terminals that participate in mixing include a single-channel sending terminal, perform up-mixing according to location information that is pre-assigned to the single-channel sending terminal to obtain a double-channel audio signal of the single-channel sending terminal, where the double-channel audio signal of the single-channel sending terminal has a set location; and if the sending terminals that participate in mixing include a multi-channel sending terminal, perform down-mixing to obtain a double-channel audio signal of the multi-channel sending terminal; and perform mixing processing on a processed double-channel audio signal of the single-channel sending terminal that participates in mixing, an audio signal of the double-channel sending terminal, and/or a processed double-channel sending terminal of the multi-channel sending terminal, encode the mixed audio signal, and send the encoded mixed audio signal to the double-channel receiving terminal; and the third mixing processing module 1004, configured to, if the sending terminals that participate in mixing include a single-channel sending terminal, perform up-mixing according to location information that is pre-assigned to the single-channel sending terminal to obtain a multi-channel audio signal of the single-channel sending terminal, where the multi-channel audio signal of the single-channel sending terminal has a set location; and if the sending terminals that participate in mixing include a double-channel sending terminal, perform up-mixing to obtain a multi-channel audio signal of the double-channel sending terminal; and perform mixing processing on a processed multi-channel audio signal of the single-channel sending terminal that participates in mixing, a processed multi-channel sending terminal of the double-channel sending terminal, and/or an audio signal of the multi-channel sending terminal, encode the mixed audio signal, and send the encoded mixed audio signal to the multi-channel receiving terminal.

If the sending terminals that participate in mixing include a single-channel sending terminal that participates in mixing, a specific implementation manner of the second mixing processing module 1003 performing up-mixing according to the location information that is pre-assigned to the single-channel sending terminal to obtain the double-channel audio signal of the single-channel sending terminal, where the double-channel audio signal of the single-channel sending terminal has the set location, may specifically be, but is not limited to: allocating energy to a single-channel audio signal of the single-channel sending terminal according to the location information of the single-channel sending terminal to obtain a double-channel audio signal that has spatial location information. For example, if a location assigned to the single-channel sending terminal is a “right” location, energy allocated to a right-channel audio signal may be greater than energy allocated to a left-channel audio signal. If the sending terminals that participate in mixing include a multi-channel sending terminal, a specific implementation manner of the second mixing processing module 1003 performing down-mixing to obtain the double-channel audio signal of the multi-channel sending terminal may be, but is not limited to: re-allocating energy to a multi-channel audio signal of the multi-channel sending terminal according to location information of the multi-channel sending terminal to obtain a double-channel audio signal that has the location information of the multi-channel sending terminal. If the sending terminals that participate in mixing include the single-channel sending terminal that participates in mixing, for a specific implementation manner of the third mixing processing module 1004 performing up-mixing according to the location information that is pre-assigned to the single-channel sending terminal to obtain the multi-channel audio signal of the single-channel sending terminal, where the multi-channel audio signal of the single-channel sending terminal has the set location, reference may be made to the implementation manner of generating the double-channel audio signal, and is not described here again.

If the sending terminals that participate in mixing include a double-channel sending terminal, a specific implementation manner of the third mixing processing module 1004 performing up-mixing to obtain the multi-channel audio signal of the double-channel sending terminal may be, but is not limited to: re-allocating energy to a double-channel audio signal of the double-channel sending terminal according to location information of the double-channel sending terminal to obtain a multi-channel audio signal that has the location information of the double-channel sending terminal.

The device provided in the preceding embodiment of the present invention may be disposed in a video communication system, and may also be disposed in another audio system that requires mixing processing, such as a telephone conference, and may specifically be an MCU.

With the device provided in this embodiment of the present invention, in a mixing system of sending terminals with multiple channel types and receiving terminals with multiple channel types, a location sense of each sending terminal that participates in mixing exists, thereby improving an on-the-spot feeling of an audience in a conference.

For the single-channel receiving terminal, audio signals of the double-channel sending terminal or the multi-channel sending terminal need to be merged into a single-channel audio signal, where the double-channel sending terminal or the multi-channel sending terminal participates in mixing, so as to participate in mixing. Accordingly, the first mixing processing module 1002 further includes a double/multi-channel processing sub-module 10021, configured to detect each channel of the double-channel sending terminal or the multi-channel sending terminal, where the double-channel sending terminal or the multi-channel sending terminal participates in mixing, select a channel whose audio signal energy satisfies a predetermined condition, and merge audio signals of the channel whose audio signal energy satisfies the predetermined condition into a single-channel audio signal. As an example rather than a limitation, the satisfying the predetermined condition may be being greater than a set threshold (N), which indicates that an audio signal of the channel is a valid voice signal rather than a background noise; and the predetermined condition to be satisfied may also be a discriminant that is generated for a valid voice signal.

For the single-channel receiving terminal, in order to obtain location information of the sending terminal that has the maximum audio signal energy on each sub-band of the mixed audio signal and participates in mixing, the first mixing processing module 1002 further includes a location information obtaining sub-module 10022, configured to: respectively compare, on each sub-band of an audio signal that participates in mixing, energy of the audio signal of the single-channel sending terminal that participates in mixing, energy of the processed single-channel audio signal of the double-channel sending terminal that participates in mixing, and/or energy of the processed single-channel audio signal of the multi-channel sending terminal that participates in mixing; determine a sending terminal that has maximum audio signal energy on each sub-band and participates in mixing; and obtain location information of the sending terminal that has the maximum audio signal energy on each sub-band and participates in mixing. If a sending terminal that has maximum audio signal energy on a certain sub-band and participates in mixing is the location information of the double-channel sending terminal or the multi-channel sending terminal, a specific implementation manner of the location information obtaining sub-module obtaining location information of the double-channel sending terminal or the multi-channel sending terminal, where the double-channel sending terminal or the multi-channel sending terminal has maximum audio signal energy on the certain sub-band, includes: detecting a location of the double-channel sending terminal or the multi-channel sending terminal to obtain location information of the double-channel sending terminal or the multi-channel sending terminal, where the location information is an actual location of the double-channel sending terminal or the multi-channel sending terminal, or the location information is a location that is pre-assigned to the double-channel sending terminal or the multi-channel sending terminal.

In the preceding embodiment of the present invention, the second mixing processing module 1003 includes a second mixing sub-module 10031, configured to: superimpose a processed left-channel audio signal of the single-channel sending terminal that participates in mixing, a left-channel audio signal of the double-channel sending terminal, and/or a processed left-channel audio signal of the multi-channel sending terminal; superimpose a processed right-channel audio signal of the single-channel sending terminal that participates in mixing, a right-channel audio signal of the double-channel sending terminal, and/or a processed right-channel audio signal of the multi-channel sending terminal; and obtain a mixed double-channel audio signal.

In the preceding embodiment of the present invention, the third mixing processing module 1004 includes a third mixing sub-module 10041, configured to: superimpose audio signals with the same channel in the processed multi-channel audio signal of the single-channel sending terminal that participates in mixing, the processed double-channel audio signal of the double-channel sending terminal, and/or the audio signal of the multi-channel sending terminal respectively; and obtain a mixed multi-channel audio signal.

In the preceding embodiment of the present invention, the location information of the single-channel sending terminal that participates in mixing is pre-assigned to the single-channel sending terminal, and the location information of the double-channel sending terminal may be obtained through detection. A specific detection manner belongs to the prior art and is not described here. Alternatively, the location information of the double-channel sending terminal or the multi-channel sending terminal may also be location information that is pre-assigned to the double-channel sending terminal or the multi-channel sending terminal. Accordingly, if the device provided in this embodiment of the present invention is in a video communication system, the device further includes a first location assignment module 1005, configured to assign location information to the single-channel sending terminal, the double-channel sending terminal, or the multi-channel sending terminal according to a position of the single-channel sending terminal, the double-channel sending terminal, or the multi-channel sending terminal in a video image of the video communication system, where the position in the video image may refer to a display position in a multi-image, that is, in a multi-grid image of a display screen, and may also refer to a display position in a TelePresence image, that is, in a video image formed by multiple display screens. If the device provided in this embodiment of the present invention is in a communication system, the device further includes a second location assignment module 1006, configured to set location information for the single-channel sending terminal, the double-channel sending terminal, or the multi-channel sending terminal according to location assignment information that is sent by a receiving terminal in the communication system, where the location assignment information is a location that is assigned by the receiving terminal to the single-channel sending terminal, the double-channel sending terminal, or the multi-channel sending terminal. The location assignment information may also carry assignment validation information. The assignment validation information is used to indicate that location information is assigned to the single-channel sending terminal, the double-channel sending terminal, or the multi-channel sending terminal only during mixing processing of sending it to the receiving terminal, or the location information is assigned to the single-channel sending terminal, the double-channel sending terminal, or the multi-channel sending terminal during mixing processing of sending it to several or all receiving terminals. If multiple receiving terminals assign a location to the same single-channel sending terminal, the same double-channel sending terminal, or the same multi-channel sending terminal, a control end may set a location for the single-channel sending terminal, the double-channel sending terminal, or the multi-channel sending terminal in turn according to an order of receiving different location assignment information, or set a location for the sending terminal in a manner of requesting for a token, and may also control, according to another set rule, permission that the terminal sets a location for the sending terminal. In the preceding embodiment of the present invention, a situation of pre-assigning a location to the double-channel sending terminal or the multi-channel sending terminal is further included. For an implementation manner of assigning a location to the double-channel sending terminal or the multi-channel sending terminal, reference is made to the implementation manner of assigning the location to the single-channel sending terminal.

Figure 11:
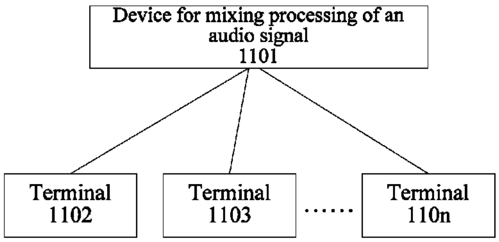
FIG. 11 is a schematic structural diagram of a system according to an embodiment of the present invention.

An embodiment of the present invention further provides a system for mixing processing of an audio signal. A structure of the system is shown in FIG. 11. A specific implementation structure includes the device for mixing processing of an audio signal 1101, and at least one terminal 1102 to 110*n* for sending or receiving an audio signal through the device for mixing processing of an audio signal. A type of the terminal is a single-channel terminal, a double-channel terminal, or a multi-channel terminal. When the terminal participates in mixing, the terminal is called a sending terminal; and when the terminal receives a mixed audio signal, the terminal is called a receiving terminal. The system may be a video communication system, may also be an audio communication system, and may also be another mixing processing system that requires mixing processing. For a specific mixing processing process of the mixing system, reference may be made to the description of the preceding embodiment of the present invention, and is not described here again.

All or a part of the steps of the preceding method embodiments may be implemented by a program instructing relevant hardware. The program may be stored in a computer readable storage medium. When the program runs, the steps of the preceding method embodiments are performed. The storage medium may be any medium that is capable of storing program codes, such as a ROM, a RAM, a magnetic disk or an optical disk.

The preceding descriptions are only exemplary embodiments of the present invention, but are not intended to limit the protection scope of the present invention. Any change or replacement that may be easily figured out by persons skilled in the art within the technical scope disclosed by the present invention shall fall within the protection scope of the present invention. Therefore, the protection scope of the present invention shall be subject to the protection scope of the claims.

What is claimed is:

1. A method for processing audio signals using a Multipoint Control Unit (MCU) in communication with multiple terminals in a conference system, wherein the multiple terminals include more than one sending terminal and at least one receiving terminal, the method comprising:

receiving, by the MCU, audio signals sent from the more than one sending terminal;

determining, by the MCU, that a channel quantity of a first receiving terminal of the at least one receiving terminal is bigger than one, and that a channel quantity of a first sending terminal of the more than one sending terminal is different from the channel quantity of the first receiving terminal;

processing, by the MCU, based on the determining, a first audio signal received from the first sending terminal based on location information assigned by the MCU to the first sending terminal, to obtain a processed audio signal capable of indicating a location represented by the location information at the first receiving terminal, wherein a channel quantity of the processed audio signal is the same as the channel quantity of the first receiving terminal;

mixing, by the MCU, the processed audio signal and a second audio signal originated from a second sending terminal of the more than one sending terminal to obtain a mixed audio signal, wherein a channel quantity of the second audio signal is the same as the channel quantity of the first receiving terminal;

encoding, by the MCU, the mixed audio signal; and sending, by the MCU, the encoded mixed audio signal to the first receiving terminal.

2. The method according to claim 1, wherein the second sending terminal and the first receiving terminal are different terminals.

3. The method according to claim 1, wherein the processing by the MCU the first audio signal received from the first sending terminal comprises:

allocating energy of the first audio signal to N channels according to the location information, so as to obtain the processed audio signal, wherein N is the channel quantity of the first receiving terminal.

4. The method according to claim 1, wherein the mixing comprises:

superimposing the processed audio signal and the second audio signal respectively on each channel to obtain the mixed audio signal.

5. The method according to claim 1, wherein before the processing of the first audio signal by the MCU, the method further comprises:

assigning, by the MCU, the location information for the first sending terminal according to location assignment information received from the first receiving terminal, wherein the location assignment information comprises a location assigned by the first receiving terminal to the first sending terminal.

6. The method according to claim 1, wherein the conference system is a video conference system, and before the processing of the first audio signal by the MCU, the method further comprises:

assigning, by the MCU, the location information to the first sending terminal according to a relative position of a video image sent from the first sending terminal in video images displayed on a screen of the first receiving terminal.

7. The method according to claim 1, wherein the second audio signal is an audio signal received from the second sending terminal.

8. The method according to claim 1, wherein the second audio signal is obtained by the MCU through processing a third audio signal received from the second sending terminal, and wherein a channel quantity of the second sending terminal is different from the channel quantity of the first receiving terminal.

9. A non-transitory computer readable medium, part of a Multipoint Control Unit (MCU) in communication with multiple terminals in a conference system, wherein the multiple terminals include more than one sending terminal and at least one receiving terminal, having processor-executable instructions stored thereon for processing audio signals, the processor-executable instructions, when executed by a processor, causing the MCU to perform the following:

receiving audio signals sent from the more than one sending terminal;

determining that a channel quantity of a first receiving terminal of the at least one receiving terminal is bigger than one, and that a channel quantity of a first sending terminal of the more than one sending terminal is different from the channel quantity of the first receiving terminal;

processing, based on the determining, a first audio signal received from the first sending terminal based on location information assigned by the MCU to the first sending terminal, to obtain a processed audio signal capable of indicating a location represented by the location information at the first receiving terminal, wherein a channel quantity of the processed audio signal is the same as the channel quantity of the first receiving terminal;

mixing the processed audio signal and a second audio signal originated from a second sending terminal of the more than one sending terminal to obtain a mixed audio signal, wherein a channel quantity of the second audio signal is the same as the channel quantity of the first receiving terminal;

encoding the mixed audio signal; and sending the encoded mixed audio signal to the first receiving terminal.

10. The non-transitory computer readable medium according to claim 9, wherein the second sending terminal and the first receiving terminal are different terminals.

11. The non-transitory computer readable medium according to claim 10, wherein the processing of the first audio signal comprises:

allocating energy of the first audio signal to N channels according to the location information, so as to obtain the processed audio signal, wherein N is the channel quantity of the first receiving terminal.

12. The non-transitory computer readable medium according to claim 9, wherein the mixing comprises:

superimposing the processed audio signal and the second audio signal respectively on each channel;

obtaining the mixed audio signal based on the superimposed audio signals.

13. The non-transitory computer readable medium according to claim 9, wherein the processor-executable instructions, when executed by a processor, further cause the MCU to further perform the following:

assigning the location information for the first sending terminal according to location assignment information received from the first receiving terminal, wherein the location assignment information comprises a location assigned by the first receiving terminal to the first sending terminal.

14. The non-transitory computer readable medium according to claim 9, wherein the processor-executable instructions, when executed by a processor, further cause the MCU to further perform the following:

assigning the location information to the first sending terminal according to a relative position of a video image sent from the first sending terminal in video images displayed on a screen of the first receiving terminal.

15. The non-transitory computer readable medium according to claim 9, wherein the second audio signal is an audio signal received from the second sending terminal.

16. The non-transitory computer readable medium according to claim 9, wherein the second audio signal is obtained by the MCU through processing a third audio signal received from the second sending terminal, wherein the processing of the third audio signal is performed by the MCU through executing the codes, and wherein a channel quantity of the second sending terminal is different from the channel quantity of the first receiving terminal.

17. A conference system for processing audio signals, comprising:

a Multipoint Control Unit (MCU) in communication with multiple terminals, wherein the multiple terminals include more than one sending terminal and at least one receiving terminal;

wherein the MCU is configured to:

receive audio signals sent from the more than one sending terminal;

determine that a channel quantity of a first receiving terminal of the at least one receiving terminal is bigger than one, and that a channel quantity of a first sending terminal of the more than one sending terminal is different from the channel quantity of the first receiving terminal;

process, based on the determination, a first audio signal received from the first sending terminal based on location information assigned by the MCU to the first sending terminal, to obtain an processed audio signal capable of indicating a location represented by the location information at the first receiving terminal, wherein a channel quantity of the processed audio signal is the same as the channel quantity of the first receiving terminal;

mix the processed audio signal and a second audio signal originated from a second sending terminal of the more than one sending terminal to obtain a mixed audio signal, wherein a channel quantity of the second audio signal is the same as the channel quantity of the first receiving terminal;

encode the mixed audio signal; and send the encoded mixed audio signal to the first receiving terminal.

18. The conference system according to claim 17, wherein the MCU being configured to process the first audio signal comprises the MCU being configured to:

allocate energy of the first audio signal to N channels according to the location information, so as to obtain the processed audio signal, wherein N is the channel quantity of the first receiving terminal.

19. The conference system according to claim 17, wherein the conference system further comprises the multiple terminals.

* * * * *

UNITED STATES PATENT AND TRADEMARK OFFICE

CERTIFICATE OF CORRECTION

PATENT NO. : 8,705,770 B2
APPLICATION NO. : 13/650628
DATED : April 22, 2014
INVENTOR(S) : Liang It is certified that error appears in the above-identified patent and that said Letters Patent is hereby corrected as shown below:

*On the Title page, item (74) Law Firm "Leydig, Voiy & Mayer, Ltd." should read --Leydig, Voit & Mayer, Ltd.--.*

*In the Claims*

*Column 22, Claim 17, Line 36 "obtain an processed audio" should read --obtain a processed audio--.*

Signed and Sealed this
Sixteenth Day of September, 2014

Michelle K. Lee

*Deputy Director of the United States Patent and Trademark Office*